United States Patent
Himmelmann

(10) Patent No.: US 8,109,165 B2
(45) Date of Patent: Feb. 7, 2012

(54) COMPLIANT NON-JAMMING END OF TRAVEL STOP FOR A BALL SCREW ACTUATOR

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 163 days.

(21) Appl. No.: 12/568,759

(22) Filed: Sep. 29, 2009

(65) Prior Publication Data

US 2011/0072921 A1 Mar. 31, 2011

(51) Int. Cl.
*F16H 3/06* (2006.01)
*F16H 27/02* (2006.01)
*F16H 29/02* (2006.01)
*F16H 29/20* (2006.01)

(52) U.S. Cl. ................................... 74/89.37; 74/89.39
(58) Field of Classification Search .............. 74/89.23, 74/89.37, 89.39, 424.71, 424.82
See application file for complete search history.

(56) References Cited

U.S. PATENT DOCUMENTS

| | | | |
|---|---|---|---|
| 3,203,257 A | 8/1965 | Geyer | |
| 3,213,701 A | 10/1965 | Earl, Jr. | |
| 3,766,798 A * | 10/1973 | Kusiak | 74/89.37 |
| 4,712,440 A | 12/1987 | Rousselot | |
| 4,753,572 A | 6/1988 | Kusiak | |
| 5,451,141 A | 9/1995 | Carvalho et al. | |
| 5,462,410 A | 10/1995 | Smith et al. | |
| 5,868,032 A * | 2/1999 | Laskey | 74/89.37 |
| 5,984,068 A | 11/1999 | Reed, Jr. | |
| 6,202,803 B1 | 3/2001 | Lang | |
| 7,367,891 B2 | 5/2008 | Bae | |
| 7,431,133 B2 | 10/2008 | Maron et al. | |
| 2008/0203221 A1 | 8/2008 | Flatt | |
| 2009/0108130 A1 | 4/2009 | Flatt | |
| 2010/0162837 A1* | 7/2010 | Cavalier et al. | 74/89.23 |

FOREIGN PATENT DOCUMENTS

GB 552485 4/1943

OTHER PUBLICATIONS

U.S. Appl. No. 12/174,038, "Aircraft Landing Gear Actuator", filed on Jul. 16, 2008.
U.S. Appl. No. 12/131,996, "Aircraft Landing Gear Unlock Actuator", filed on Jun. 3, 2008.
Extended European Search Report for Application No. EP 10 25 1675 mailed Sep. 23, 2011.

* cited by examiner

*Primary Examiner* — Justin Krause
(74) *Attorney, Agent, or Firm* — Carlson, Gaskey & Olds, P.C.

(57) ABSTRACT

A linear actuator includes a first structure having an axis. A second structure is configured to translate relative to the first structure in response to rotation of the first structure. First and second stops are respectively operatively connected to the first and second structures. The first and second stops are configured to engage with one another at a travel limiting position. A compliant member is operatively arranged between the first and second structures and is configured to absorb energy between the first and second structures in the travel limiting position.

12 Claims, 2 Drawing Sheets

COMPLIANT NON-JAMMING END OF TRAVEL STOP FOR A BALL SCREW ACTUATOR

BACKGROUND

This disclosure relates to a ball screw actuator, and more specifically, to an electromechanical actuator for aerospace applications.

One type of electromechanical actuator (EMA) uses a ball screw driven by an electric motor, and optionally through a gearbox. When designing small, high power density EMAs, the rotational inertia exerted on the ball screw by the motor can be problematic. A large motor will produce a significant amount of rotational inertia. When a gearbox is used, the inertia of the motor imparted to the ball screw is proportional to the motor's inertia multiplied by the gear reduction ratio squared.

The inertia of the motor is important when sizing the gear train, the ball screw, and/or the support structure. A typical EMA includes one or more end stops to limit actuator travel at fully retracted and/or fully extended positions. If the traveling actuator impacts its end of travel stop, the rotational inertia of the motor will tend to cause the actuator to continue driving through the end stop, causing significant damage to the EMA. If the end stops are strong enough to maintain their integrity, the next weakest link, typically the ball screw or the gearbox, can be damaged.

Historically, damage to the EMA is avoided by over-designing the gearbox, the stops and surrounding support structure to handle the intense torque spike associated with the nearly instantaneous stopping of the ball screw as the ball screw impacts its end of travel stop, and the motor exerts its rotational inertia. As the motor continues to rotate with the ball screw stopped, the internal shafting, gears, and support structure distort. Over-designing the EMA to handle this torque spike results in an actuator that is significantly larger and heavier than it would otherwise have to be.

SUMMARY

A linear actuator is disclosed that includes a first structure having an axis. A second structure is configured to translate relative to the first structure in response to rotation of the first structure. First and second stops are respectively operatively connected to the first and second structures. The first and second stops are configured to engage with one another at a travel limiting position. A compliant member is operatively arranged between the first and second structures and is configured to absorb energy between the first and second structures in the travel limiting position.

In the disclosed example, the first structure is a ball screw that includes an inner bore and an outer surface with a ball screw track. The ball screw has a first face. The compliant member is a torsion spring disposed within the inner bore and having first and second spaced apart portions. The first portion is connected to the ball screw. The torsion spring has loaded and unloaded conditions. The second stop is connected to the second portion and has a second face. A gap is arranged between the first and second faces. The gap includes first and second sizes respectively in the unloaded and loaded conditions. The first size is greater than the second size.

In operation, the first structure is rotated to linearly move the second structure. The first and second stops engage one another in the travel limiting position. The compliant member deflects to absorb energy with the stops engaged in the travel limiting position.

These and other features of the disclosure can be best understood from the following specification and drawings, the following of which is a brief description.

DETAILED DESCRIPTION

Figure 1:
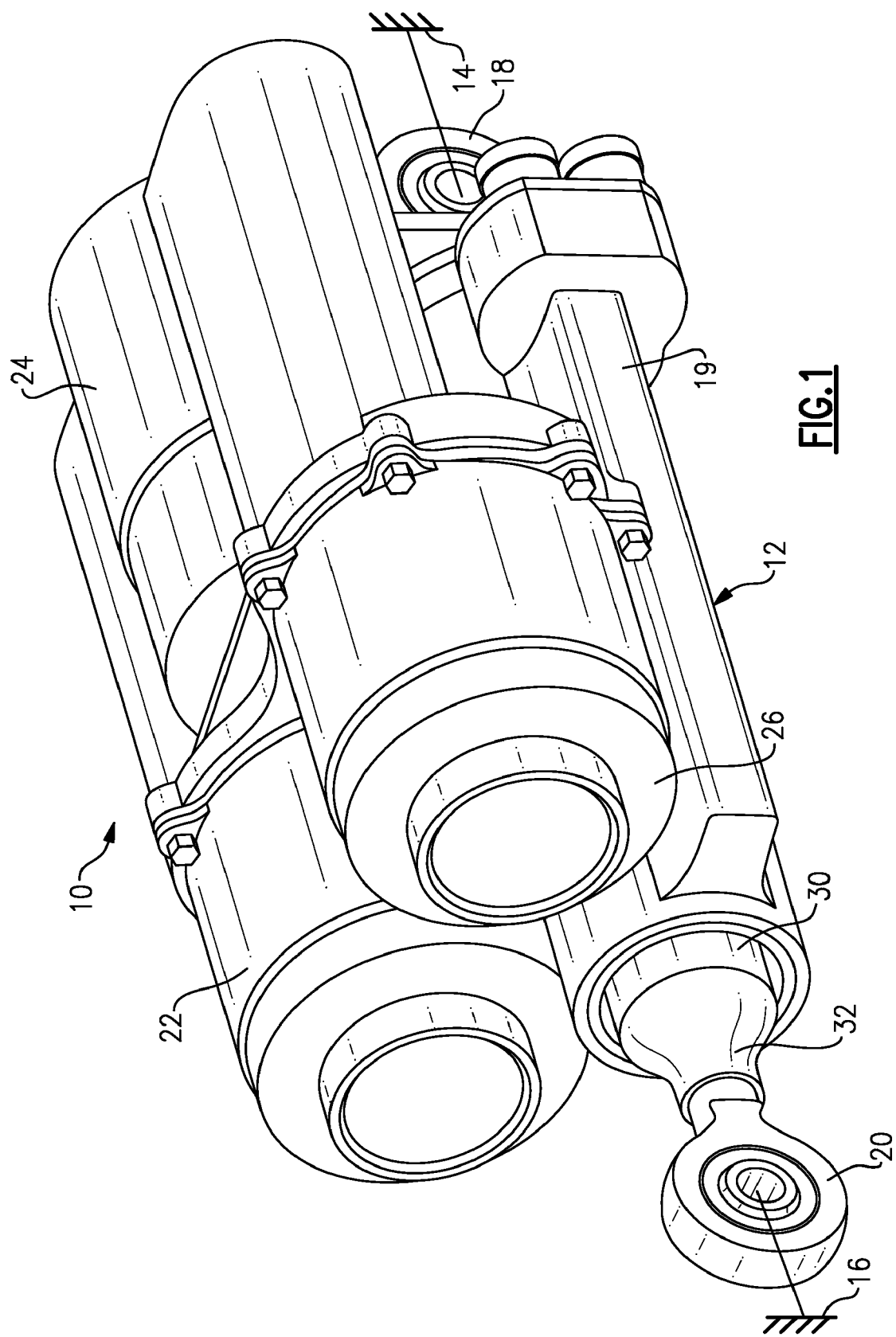
FIG. 1 is a perspective view of an example linear actuation system.

A linear actuator system 10 is illustrated in FIG. 1. The system 10 includes an electromechanical actuator 12 interconnected between first and second member 14, 16. The actuator 12 extends and retracts to move the first and second members 14, 16 relative to one another.

The actuator 12 includes a housing 19 providing a first end 18 connected to the first member 14. A second end 20 is supported by the housing 19 for translation and is connected to the second member 16. A motor 22 and gearbox 24 are supported on the housing 19. A brake 26 is also supported by the housing 19 in the example shown and is used to cooperate with the gearbox 24 during operation of the actuator 12.

Figure 2:
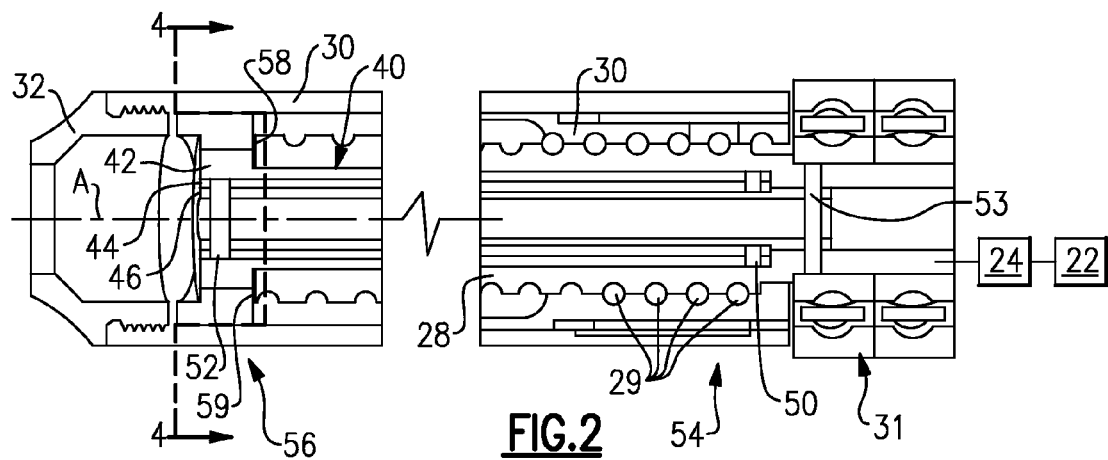
FIG. 2 is a partial cross-sectional view of a portion of the linear actuator illustrated in FIG. 1.
Figure 3:
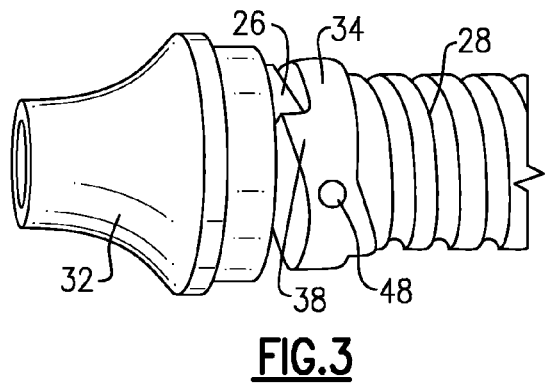
FIG. 3 is a perspective view of a portion of a ball screw and first and second stops cooperating with one another in a travel limiting position.

Referring to FIGS. 2 and 3, the actuator 12 includes a sleeve 30 supporting an end portion 32 that provides the second end 20. The sleeve 30 is received within a bore in the housing 19 (shown in FIGS. 1 and 4) for linear translation relative to the housing 19. Returning to FIG. 2, a ball screw 28 is disposed within the sleeve 30 and is rotationally driven about an axis A by the motor 22 through gearbox 24. One end of the ball screw 28 is supported within the housing 19 by a thrust bearing 31.

The ball screw 28 has an outer surface providing a ball screw track supporting balls 29 received by a corresponding ball screw track on an inner diameter of the sleeve 30. The ball screw 28 supports a stop 34 opposite the thrust bearing 31 and adjacent to the end portion 32. First and second stop lugs 36, 38 are respectively provided on the stop 34 and end portion 32. The first and second lugs 36, 38 engage one another in a travel limiting position, which corresponds to a fully retracted position in the example shown in FIG. 2. It should be understood that a similar end of travel stop can be used for the fully extended position.

Figure 4:
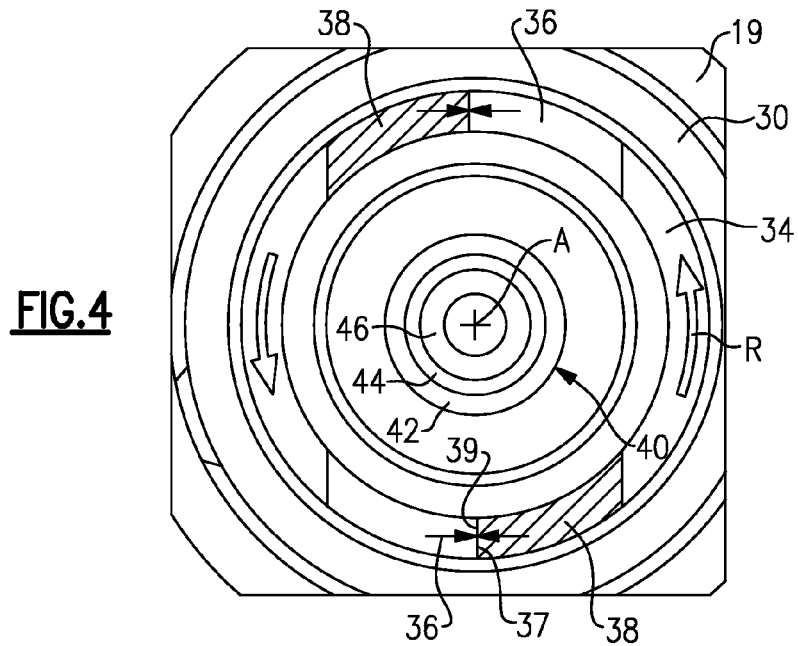
FIG. 4 is a cross-sectional view taken along line 4-4 of FIG. 2.

Referring to FIGS. 2 and 4, a compliant member 40 is operatively arranged between the stop 34 and ball screw 28 to absorb energy between the ball screw and stop 28, 34 in the travel limiting position to prevent jamming and/or damage to the actuator 12. In the example, the compliant member 40 includes a torsion spring provided by first, second and third tubular members 42, 44, 46. The members 42, 44, 46 are nested relative to one another and dispose within an inner bore in the ball screw 28. The first member 42 is secured to the stop 34 by a pin 48 at an outer end 56 of the compliant member 40, shown in FIG. 3. Ends of the first and second members 42, 44 are secured to one another by a pin 50 at an inner end 54 opposite the stop 34. The second and third members 44, 46 are secured to one another by a third pin 52 at the outer end 56. The third member 46 is secured to the ball screw 28 by a pin 53 near at the inner end 54. One or more of the pins 48, 50, 52, 53 may be replaced by splines, welds or bolts, for example.

The material, length and wall thickness of first, second and third members 42, 44, 46 are selected based upon the available spaces and the operating characteristics of the actuator 12. A fewer or greater number of tubular members than the number disclosed may be used. Nesting tubular members enables a torsional spring to be provided in a very compact space.

The travel limiting position is shown in FIG. 4 in which first and second surfaces 37, 39 respectively of the first and second stop lugs 36, 38 have engaged one another after rotation R of the ball screw 28 about axis A. The kinetic energy of the motor 22 and gearbox 24 will continue to be transmitted to the ball screw 28. This kinetic energy will be transmitted from the stop 34 to the first member 42, then to the second member 44, then to the third member 46 to absorb the rotational energy. After the compliant member 40 has been loaded, the first, second and third members 42, 44, 46 will unload and back-drive the ball screw 28, gearbox 24 and electric motor 22.

When the first and second stop lugs 36, 38 initially engage one another, the compliant member 40 is unloaded. With the first and second stop lugs 36, 38 engaging one another and the compliant member unloaded 40, a gap 60 of a first size is provided between first and second faces 58, 59 of the stop 34 and ball screw 28. As the compliant member 40 becomes loaded the gap 60 will reduce to a second size as the ball screw 28 continues to rotate and the axial length of the first, second and third members 42, 44, 46 winds up. As the ball screw 28 rotates, it forces the ball screw nut to continue to translate, forcing the gap 60 to be reduced. The first size of the gap 60 is selected to prevent the first and second faces 58, 59 from engaging one another when the compliant member 40 becomes fully loaded after absorbing the inertia within the actuator 12.

Although example embodiments have been disclosed, a worker of ordinary skill in this art would recognize that certain modifications would come within the scope of the claims. For that reason, the following claims should be studied to determine their true scope and content.

What is claimed is:

1. A linear actuator comprising:
    a first structure having an axis;
    a second structure configured to translate relative to the first structure in response to rotation of the first structure;
    first and second stops respectively operatively connected to the first and second structures, the first and second stops configured to engage with one another at a travel limiting position; and
    a compliant member operatively arranged between the first and second structures and configured to absorb energy between the first and second structures in the travel limiting position, wherein the compliant member includes a torsion spring.

2. The linear actuator according to claim 1, wherein the first structure is a ball screw, and the second structure is a sleeve supporting the second stop.

3. The linear actuator according to claim 2, comprising a housing with a bore telescopically receiving the sleeve, the ball screw arranged nested relative to the sleeve in a retracted position.

4. The linear actuator according to claim 3, comprising a gearbox and electric motor supported by the housing, the electric motor configured to rotationally drive the ball screw about the axis via the gearbox.

5. The linear actuator according to claim 1, wherein the torsion spring comprises at least one tube.

6. The linear actuator according to claim 5, wherein multiple tubes are arranged coaxially with one another about the axis, the tubes interconnecting the ball screw and the second stop.

7. The linear actuator according to claim 6, wherein the tubes are nested relative to one another and arranged coaxially with the first member.

8. The linear actuator according to claim 1, wherein a gap is provided axially between the first member and the first stop in the travel limiting position, the gap configured to decrease in size as the compliant member absorbs the energy.

9. A linear actuator comprising:
    a ball screw including an inner bore and an outer surface with a ball screw track, the ball screw having a first face;
    a torsion spring disposed within the inner bore having first and second spaced apart portions and an intermediate portion arranged between the first and second portions, the first portion connected to the ball screw, the intermediate portion unsecured to the inner bore, the torsion spring having loaded and unloaded conditions; and
    stop connected to the second portion and having a second face, a gap arranged between the first and second faces, the gap including first and second sizes respectively in the unloaded and loaded conditions, the first size greater than the second size.

10. The linear actuator according to claim 9, wherein the torsion spring comprises at least one tube.

11. The linear actuator according to claim 10, wherein multiple tubes are arranged coaxially with one another about the axis, the tubes interconnected and axially affixed relative to one another, the ball screw and the stop by pins.

12. The linear actuator according to claim 11, wherein the tubes are nested relative to one another and arranged coaxially with the ball screw.

\* \* \* \* \*